(12) United States Patent
Kim et al.

(10) Patent No.: US 10,664,108 B2
(45) Date of Patent: May 26, 2020

(54) TOUCH SENSOR AND ELECTRONIC DEVICE INCLUDING THE TOUCH SENSOR

(71) Applicant: SAMSUNG ELECTRONICS CO., LTD., Suwon-si (KR)

(72) Inventors: Dongkyun Kim, Suwon-si (KR); Seogwoo Hong, Yongin-si (KR); Byungkyu Lee, Seoul (KR); Seokwhan Chung, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 129 days.

(21) Appl. No.: 15/375,765

(22) Filed: Dec. 12, 2016

(65) Prior Publication Data

US 2017/0364176 A1 Dec. 21, 2017

(30) Foreign Application Priority Data

Jun. 17, 2016 (KR) .................. 10-2016-0075835

(51) Int. Cl.
| | | |
|---|---|---|
| *G06F 3/044* | (2006.01) | |
| *G06K 9/20* | (2006.01) | |
| *G06F 3/041* | (2006.01) | |
| *G06K 9/00* | (2006.01) | |

(52) U.S. Cl.
CPC .......... *G06F 3/044* (2013.01); *G06F 3/0416* (2013.01); *G06K 9/0002* (2013.01); *G06F 2203/04111* (2013.01); *G06K 9/00006* (2013.01)

(58) Field of Classification Search
CPC .......... G06F 2203/04112; G06F 3/047; G06F 3/041; G06F 3/03; G06F 3/01; G06F 3/00; G06F 3/044; G06F 3/0416; G06F 2203/04111; G06F 3/0443; G06F 3/0446; G06F 3/0448; G06K 9/00067; G06K 9/00053; G06K 9/00013; G06K 9/00006; G06K 9/00; G06K 9/002; G06K 9/008

See application file for complete search history.

(56) References Cited

U.S. PATENT DOCUMENTS

| | | | |
|---|---|---|---|
| 4,550,221 A | 10/1985 | Mabusth | |
| 6,882,164 B2 | 4/2005 | Yano et al. | |
| 8,823,666 B2 | 9/2014 | Hong | |
| 9,075,484 B2* | 7/2015 | Ritter | ...... G06F 3/044 |
| 9,348,460 B2* | 5/2016 | Lee | ...... G06F 3/0418 |
| 9,436,327 B2* | 9/2016 | Zhou | ...... G06F 3/0412 |

(Continued)

FOREIGN PATENT DOCUMENTS

| | | |
|---|---|---|
| JP | 2009-169720 A | 7/2009 |
| JP | 2010-244357 A | 10/2010 |

(Continued)

OTHER PUBLICATIONS

Communication dated Jun. 9, 2017, issued by the European Patent Office in counterpart European Application No. 17163336.5.

(Continued)

*Primary Examiner* — Julie Anne Watko

(74) *Attorney, Agent, or Firm* — Sughrue Mion, PLLC

(57) ABSTRACT

A touch sensor includes a plurality of first electrodes, a plurality of second electrodes, and a capacitance measurer configured to measure mutual capacitances between the plurality of first electrodes and the plurality of second electrodes. Each of the first electrodes includes a plurality of loop patterns.

23 Claims, 12 Drawing Sheets

(56) References Cited

U.S. PATENT DOCUMENTS

| | | | | |
|---|---|---|---|---|
| 9,483,984 B2* | 11/2016 | Seo | ............... | G06F 3/0412 |
| 10,019,110 B2* | 7/2018 | Weaver | ............... | G06F 3/041 |
| 10,095,362 B2* | 10/2018 | Hirakata | ............... | G06F 3/044 |
| 10,168,844 B2* | 1/2019 | Kwon | ............... | H01L 51/5256 |
| 2010/0013745 A1* | 1/2010 | Kim | ............... | G06F 3/0412 |
| | | | | 345/76 |
| 2010/0328249 A1* | 12/2010 | Ningrat | ............... | G06F 3/044 |
| | | | | 345/174 |
| 2011/0007030 A1* | 1/2011 | Mo | ............... | G06F 3/044 |
| | | | | 345/174 |
| 2011/0156930 A1* | 6/2011 | Chen | ............... | G06F 3/044 |
| | | | | 341/33 |
| 2012/0229414 A1* | 9/2012 | Ellis | ............... | G06F 3/044 |
| | | | | 345/174 |
| 2013/0050108 A1* | 2/2013 | Hong | ............... | G06F 3/0416 |
| | | | | 345/173 |
| 2013/0181940 A1* | 7/2013 | Lai | ............... | G06F 3/044 |
| | | | | 345/174 |
| 2013/0341651 A1* | 12/2013 | Kim | ............... | H01L 31/0232 |
| | | | | 257/84 |
| 2014/0253499 A1* | 9/2014 | Lee | ............... | G06F 3/044 |
| | | | | 345/174 |
| 2015/0042604 A1* | 2/2015 | Lu | ............... | G06F 3/044 |
| | | | | 345/174 |
| 2015/0042905 A1 | 2/2015 | Hsu | | |
| 2015/0070305 A1* | 3/2015 | Seo | ............... | G06F 3/0412 |
| | | | | 345/174 |
| 2015/0378390 A1* | 12/2015 | Liu | ............... | G06F 3/0412 |
| | | | | 345/173 |
| 2016/0150641 A1* | 5/2016 | Yoo | ............... | H05K 1/0283 |
| | | | | 345/174 |
| 2017/0123540 A1 | 5/2017 | Shih et al. | | |
| 2018/0203531 A1* | 7/2018 | Tsai | ............... | G06F 3/044 |
| 2019/0004638 A1* | 1/2019 | Lee | ............... | G06F 3/0412 |
| 2019/0050078 A1* | 2/2019 | Hamada | ............... | H01L 27/323 |

FOREIGN PATENT DOCUMENTS

| | | |
|---|---|---|
| KR | 2003-0029917 A | 4/2003 |
| KR | 10-2015-0087811 A | 7/2015 |

OTHER PUBLICATIONS

Communication dated Oct. 4, 2018, issued by the European Patent Office in counterpart European Application No. 17163336.5.

* cited by examiner

TOUCH SENSOR AND ELECTRONIC DEVICE INCLUDING THE TOUCH SENSOR

CROSS-REFERENCE TO RELATED APPLICATION

This application claims priority from Korean Patent Application No. 10-2016-0075835, filed on Jun. 17, 2016, in the Korean Intellectual Property Office, the disclosure of which is incorporated herein in its entirety by reference.

BACKGROUND

1. Field

Apparatuses consistent with exemplary embodiments relate to touch sensors capable of obtaining at least one of a location of touch and a fingerprint pattern of a user in response to the touch of the user.

2. Description of the Related Art

User authentication may be performed by using unique characteristics of users, e.g., fingerprints, voices, faces, hands, or irises of the users. User authentication may be used in various devices such as banking equipment, entrance controllers, mobile devices, laptop computers, etc. In mobile devices such as smartphones that are widely in use, fingerprint readers may be employed to perform user authentication to protect security information stored in the smartphones.

In a smartphone, a touch screen is attached to a display device to allow for an intuitive input from a user. Generally, a fingerprint reader is provided separately from the touch screen and a fingerprint is readable only in response to a touch input by a finger at a fixed location on the touch screen.

When the fingerprint reader is provided on a display panel, the fingerprint reader may use transparent electrodes so as not to obstruct a viewing of an image of the display panel. However, in this case, the transparent electrodes have small sizes to increase sensitivity of the fingerprint reader and thus have high resistances.

SUMMARY

Exemplary embodiments provide touch sensors capable of obtaining at least one of a location of touch and a fingerprint pattern of a user in response to the touch of the user, with increased sensitivity and higher driving speed.

According to an aspect of an exemplary embodiment, there is provided a touch sensor including: a plurality of first electrodes, extending in a first direction and arranged in parallel to each other; a plurality of second electrodes, extending in a second direction and arranged in parallel to each other to cross the plurality of first electrodes; and a capacitance measurer configured to obtain mutual capacitances between the plurality of first electrodes and the plurality of second electrodes, wherein at least one of the plurality of first electrodes includes: a plurality of first linear patterns provided along the first direction; and a plurality of loop patterns between the plurality of first linear patterns.

The plurality of first electrodes and the plurality of second electrodes may be provided on the same plane.

The plurality of loop patterns may be provided to respective nodes at which the plurality of first electrodes and the plurality of second electrodes cross each other.

The plurality of first electrodes may further include a plurality of second linear patterns, the plurality of second linear patterns penetrating the plurality of loop patterns and connected to the plurality of first linear patterns.

The plurality of loop patterns may respectively have polygonal shapes or circular shapes.

The plurality of loop patterns may respectively have rectangular shapes, and long sides of the rectangular shapes may be parallel to the first direction.

The plurality of loop patterns may have diamond shapes or hexagonal shapes.

The plurality of second electrodes may include linear electrodes provided along the second direction.

The plurality of first electrodes may include a plurality of third linear patterns provided along the second direction; and a plurality of second loop patterns between the plurality of third linear patterns.

The first and second directions may be perpendicular to each other.

The plurality of first electrodes and the plurality of second electrodes may be configured as metal lines.

The metal lines may have a line width less than 3 µm.

The metal lines may include at least one of aluminum (Al), copper (Cu), molybdenum (Mo), chromium (Cr), an Ag—Pd—Cu (APC) alloy, and silver (Ag).

The plurality of first electrodes and the plurality of second electrodes may be electrically separated from each other at nodes at which the plurality of first electrodes and the plurality of second electrodes cross each other.

The touch sensor may further include an insulating layer provided between the plurality of first electrodes and the plurality of second electrodes.

The capacitance measurer may include a driver configured to apply a driving voltage to the plurality of first electrodes; and a measurer configured to measure an electrical signal output from the plurality of second electrodes.

The driver may independently apply driving voltages to the plurality of first electrodes, and the measurer may independently measure electrical signals output from the plurality of second electrodes.

The driver may apply the same driving voltage to the plurality of first electrodes, and the measurer may measure a sum of electrical signals output from the plurality of second electrodes.

The capacitance measurer may include a driver configured to apply a driving voltage to the plurality of second electrodes; and a measurer configured to measure an electrical signal output from the plurality of first electrodes.

The driver may independently apply driving voltages to the plurality of second electrodes, and the measurer may independently measure electrical signals output from the plurality of first electrodes.

The driver may apply the same driving voltage to the second electrodes, and the measurer may measure a sum of electrical signals output from the plurality of first electrodes.

The touch sensor may include a protection film provided on or above the plurality of first electrodes and the plurality of second electrodes.

According to an aspect of another exemplary embodiment, there is provided an electronic device including: a display panel; a touch sensor provided on the display panel, the touch sensor including: a plurality of first electrodes, extending in a first direction and arranged in parallel to each other; a plurality of second electrodes, extending in the second direction and arranged in parallel to each other; and a capacitance measurer configured to obtain mutual capacitances between the plurality of first electrodes and the plurality of second electrodes; and a processor configured to obtain at least one of a location of touch and a fingerprint pattern of a finger that performs the touch based on the obtained mutual capacitances, wherein at least one of the plurality of first electrodes includes: a plurality of first linear patterns provided along the first direction and a plurality of loop patterns between the plurality of first linear patterns.

According to an aspect of still another exemplary embodiment, there is provided a touch sensor configured to detect a touch, the touch sensor including: first electrodes and second electrodes arranged in rows and columns; a capacitance measurer configured to, in response to the touch, obtain a variation of a mutual capacitance between a first electrode of the first electrodes and a second electrode of the second electrodes, wherein one of the first electrode and the second electrode includes a pattern that forms a void therein.

The pattern is provided to each of nodes at which the first electrodes and the second electrodes cross each other.

Another one of the first and second electrodes may include a linear pattern.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION

Figure 1:
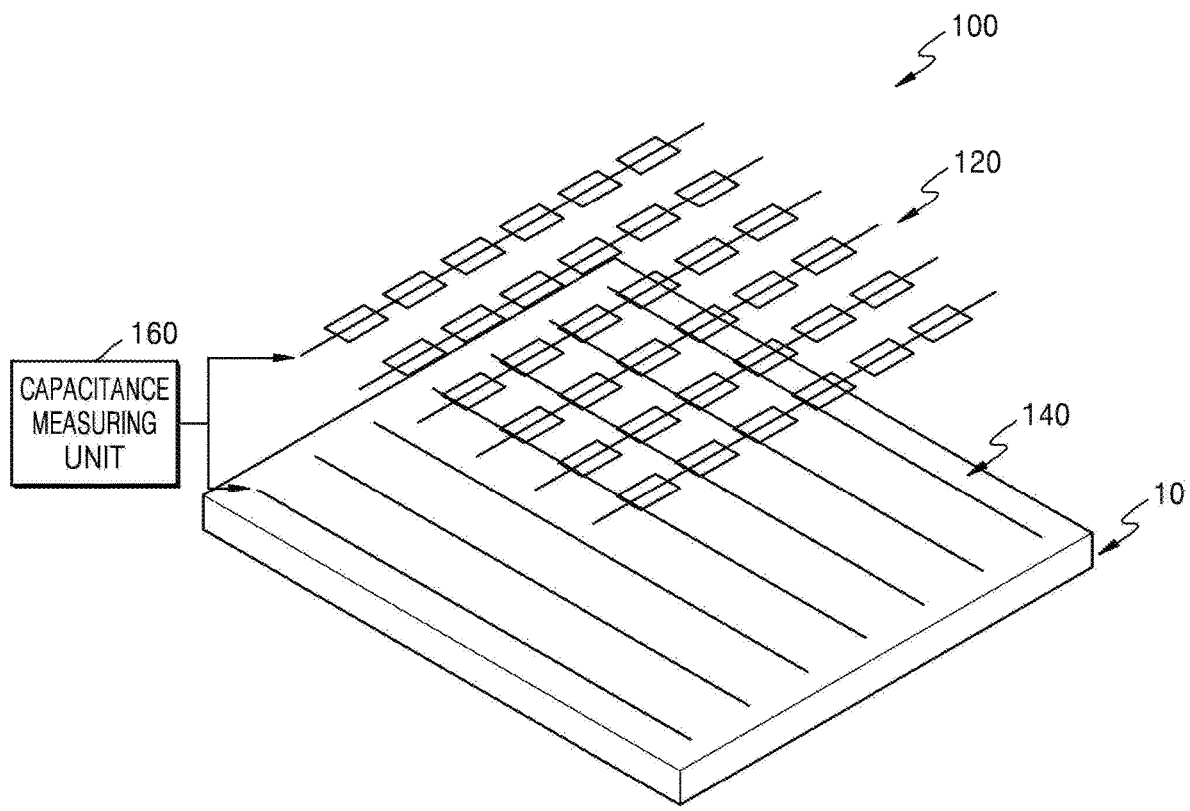
FIG. 1 is an exploded perspective view of a touch sensor according to an exemplary embodiment.

Certain exemplary embodiments are described below in greater detail with reference to the accompanying drawings.

Although the terms used in the following description are selected, as much as possible, from general terms that are widely used at present while taking into consideration the functions obtained in accordance with the exemplary embodiments, these terms may be replaced by other terms based on intentions of those skilled in the art, precedents, emergence of new technologies, or the like. In addition, in a particular case, terms that are arbitrarily selected by the applicant may be used. In this case, the meanings of these terms may be described in corresponding parts of the disclosure. Accordingly, it should be noted that the terms used herein should be construed based on practical meanings thereof and the whole content of this specification, rather than being simply construed based on names of the terms.

It will be understood that when an element is referred to as being "connected" or "coupled" to another element, it can be directly connected or coupled to the other element or intervening elements may be present. It will be further understood that a suffix "module" or "unit" is used to describe an element configured to perform at least one function or operation, and such element may be implemented by hardware, software, or a combination thereof.

It will be understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

It will be further understood that, although the terms "first", "second", etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Figure 2:
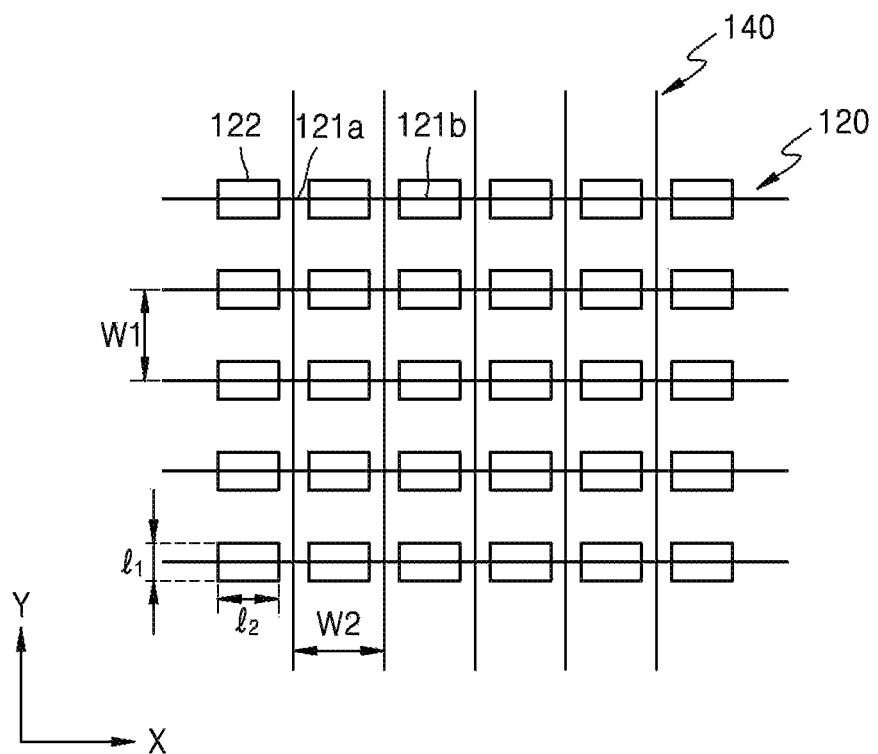
FIG. 2 is a plan view of a plurality of first electrodes and a plurality of second electrodes provided on a display panel of the touch sensor of FIG. 1.

FIG. 1 is an exploded perspective view of a touch sensor 100 according to an exemplary embodiment. FIG. 2 is a plan view of a plurality of first electrodes 120 and a plurality of second electrodes 140 provided on a display panel 10 of the touch sensor 100 of FIG. 1.

Referring to FIG. 1, the touch sensor 100 according to an exemplary embodiment may include the first electrodes 120 provided in parallel to each other along a first direction (or x-axis direction), the second electrodes 140 provided in parallel to each other along a second direction (or y-axis direction) to cross the first electrodes 120, and a capacitance measuring unit (or capacitance measurer) 160 configured to measure a mutual capacitance between the first and second electrodes 120 and 140.

The touch sensor 100 illustrated in FIG. 1 may sense touch and a location of the touch and/or a fingerprint of a finger a user that performs the touch. For example, the touch sensor 100 may sense the location of touch of a finger of the user or a touch pen on the first and second electrodes 120 and 140. Alternatively, the touch sensor 100 may sense a fingerprint pattern of the finger of the user touching the first and second electrodes 120 and 140. The user may directly touch the first and second electrodes 120 and 140. Alternatively, the user may touch a protection film (not shown) or protection glass (not shown) provided on the first and second electrodes 120 and 140.

The first and second electrodes 120 and 140 may be provided on the display panel 10. The display panel 10 may be, for example, an organic light-emitting display panel or a liquid crystal display panel but is not limited thereto. The first and second electrodes may be provided on a display surface of a display panel. Light emitted from the display panel 10 (or the display surface of the display panel 10) may be delivered to the user through the first and second electrodes 120 and 140.

The first electrodes 120 may be provided in parallel to each other along the first direction (or x-axis direction). Each of the first electrodes 120 may include a plurality of loop patterns 122 provided along the first direction (or x-axis direction). The first electrodes 120 may include a plurality of first linear patterns 121*a* provided between the loop patterns 122. The first electrodes 120 may further include a plurality of second linear patterns 121*b* configured to penetrate the loop patterns 122.

The first electrodes 120 may be configured as metal lines. When the first and second linear patterns 121*a* and 121*b* and the loop patterns 122 included in the first electrodes 120 are configured as metal lines, an area of the first electrodes 120 may have a reduced size. When the area of the first electrodes 120 has a reduced size, visibility of an image displayed on the display panel 10 under the first electrodes 120 may not be obstructed by the touch sensor 100. In other words, transmittance of light emitted from the display panel 10 (or the display surface of the display panel 10) through the first and second electrodes 120 and 140 may be increased.

The metal lines of the first electrodes 120 may include metal having a small resistivity. For example, the metal lines of the first electrodes 120 may include at least one of aluminum (Al), copper (Cu), molybdenum (Mo), chromium (Cr), an Ag—Pd—Cu (APC) alloy, and silver (Ag). When the metal lines of the first electrodes 120 include metal having a small resistivity (e.g., at least one of the above-listed metals), an excessive increase in resistance of the first electrodes 120 may not occur despite a small line width of the metal lines. For example, the line width of the metal lines of the first electrodes 120 may be less than about 3 µm.

The loop patterns 122 may have loop shapes surrounding predetermined spatial regions. The loop patterns 122 may be provided between nodes where the first and second electrodes 120 and 140 cross each other. The loop patterns 122 may be empty patterns (or patterns in which a void is provided therein). The loop patterns 122 may increase a mutual capacitance variation between the first and second electrodes 120 and 140 when the finger of the user or the touch pen touches the first and second electrodes 120 and 140.

For example, the loop patterns 122 may have rectangular shapes. Long sides of the rectangular shapes may be parallel to the first direction (or x-axis direction). When the long sides of the loop patterns 122 are parallel to the first direction (or x-axis direction) along which the first electrodes 120 are provided, the mutual capacitance variation between the first and second electrodes 120 and 140 due to touch of the user may be increased.

A distance W1 between the first electrodes 120 may be less than about 75 µm. However, the exemplary embodiments are not limited thereto. The distance W1 between the first electrodes 120 may be equal to or greater than 75 µm. In response to the distance W1 between the first electrodes 120 being decreased, sensitivity of the touch sensor 100 may be increased. A length $l_1$ of short sides of the loop patterns 122 may be less than the distance W1 between the first electrodes 120.

The loop patterns 122 have rectangular shapes as shown in FIG. 1, but the exemplary embodiments are not limited thereto. For example, the loop patterns 122 may have polygonal shapes or circular shapes. Alternatively, the loop patterns 122 may have closed curve shapes. Examples of the shapes of the loop patterns 122 will be described in detail later.

The loop patterns 122 may interconnect the first linear patterns 121*a*. The first linear patterns 121*a* may be configured as metal lines. The first linear patterns 121*a* are provided as straight lines in FIG. 1, but the exemplary embodiments are not limited thereto. For example, the first linear patterns 121*a* may be provided in any non-straight lines such as curves or polygonal lines.

The second linear patterns 121*b* may penetrate the loop patterns 122. In addition, end portions of the second linear patterns 121*b* may be connected to nodes where the loop patterns 122 and the first linear patterns 121*a* meet each other. For example, the second linear patterns 121*b* are provided as straight lines in FIG. 1. However, the exemplary embodiments are not limited thereto. For example, the second linear patterns 121*b* may be provided in any non-straight lines such as curves or polygonal lines.

The second electrodes 140 may be provided along the second direction (or y-axis direction) to cross the first electrodes 120. The first direction (or x-axis direction) and the second direction (or y-axis direction) may be perpendicular to each other. However, the exemplary embodiments are not limited thereto. The second direction may be any arbitrary direction which is not parallel to the first direction.

The second electrodes 140 may be configured as metal lines. When the second electrodes 140 are configured as metal lines, the area of the second electrodes 140 may be reduced. When the area of the second electrodes 140 is reduced, visibility of an image displayed on the display panel 10 under the second electrodes 140 may not be obstructed by the touch sensor 100.

The metal lines of the second electrodes 140 may include metal having a small resistivity. For example, the metal lines of the second electrodes 140 may include at least one of aluminum (Al), copper (Cu), molybdenum (Mo), chromium (Cr), an Ag—Pd—Cu (APC) alloy, and silver (Ag). When the metal lines of the second electrodes 140 include metals having a small resistivity (e.g., at least one of the above-listed metals), an excessive increase in resistance of the second electrodes 140 may not occur despite a small line width of the metal lines. For example, the line width of the metal lines of the second electrodes 140 may be less than about 3 µm.

The second electrodes 140 may be provided along the second direction (or y-axis direction). A distance W2 between the second electrodes 140 may be less than about 75 μm. The distance W2 between the second electrodes 140 may be the same as or different from the distance W1 between the first electrodes 120. A length $I_2$ of the long sides of the loop patterns 122 of the first electrodes 120 may be less than the distance W2 between the second electrodes 140.

The second electrodes 140 may include linear electrodes provided along the second direction. The linear electrodes are provided as straight metal lines in FIGS. 1 and 2, but the exemplary embodiment are not limited thereto. For example, the second electrodes 140 may include electrodes having curved parts. Alternatively, the second electrodes 140 may include electrodes provided as polygonal lines.

When the second electrodes 140 are configured as linear electrodes, visibility of an image displayed on the display panel 10 under the first and second electrodes 120 and 140 with respect to the user who views the image through the first and second electrodes 120 and 140 may not be obstructed. In other words, transmittance of light emitted from the display panel 10 (or the display surface of the display panel 10) through the first and second electrodes 120 and 140 may be increased. In addition, the mutual capacitance variation between the first and second electrodes 120 and 140 due to touch of the user may be further increased.

The first and second electrodes 120 and 140 may be electrically separated from each other. For example, the first and second electrodes 120 and 140 may be electrically separated from each other at nodes where the first and second electrodes 120 and 140 cross each other.

Figure 3:
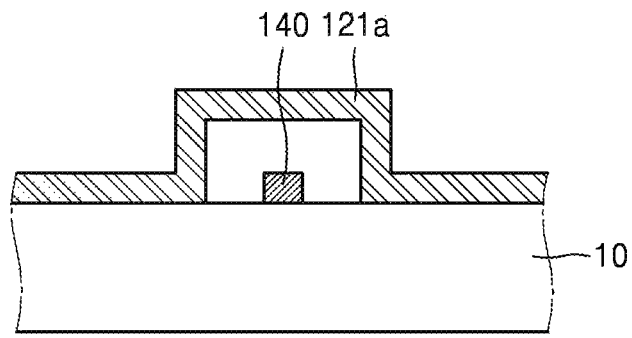
FIG. 3 is a side view of a node where a first electrode and a second electrode cross each other.

FIG. 3 is a side view of a node where the first electrode 120 and the second electrode 140 cross each other.

Referring to FIG. 3, the first linear pattern 121a of the first electrode 120 may be electrically separated from the second electrode 140. The first linear pattern 121a may have a bridge shape provided over the second electrode 140. The shape of the first linear pattern 121a illustrated in FIG. 3 is merely an example and the exemplary embodiments are not limited thereto. For example, the first linear pattern 121a may have an arc shape curved over the second electrode 140. Because the first and second electrodes 120 and 140 are electrically separated from each other, when a finger of a user touches the first and second electrodes 120 and 140, an electric field between the first and second electrodes 120 and 140 may pass through the finger of the user. The shape of the electric field between the first and second electrodes 120 and 140 and passing through the finger of the user may vary according to a fingerprint pattern of the finger.

The first and second electrodes 120 and 140 are provided on the same plane in FIG. 3 but the exemplary embodiments are not limited thereto. For example, the first and second electrodes 120 and 140 may be provided on different planes.

Figure 4:
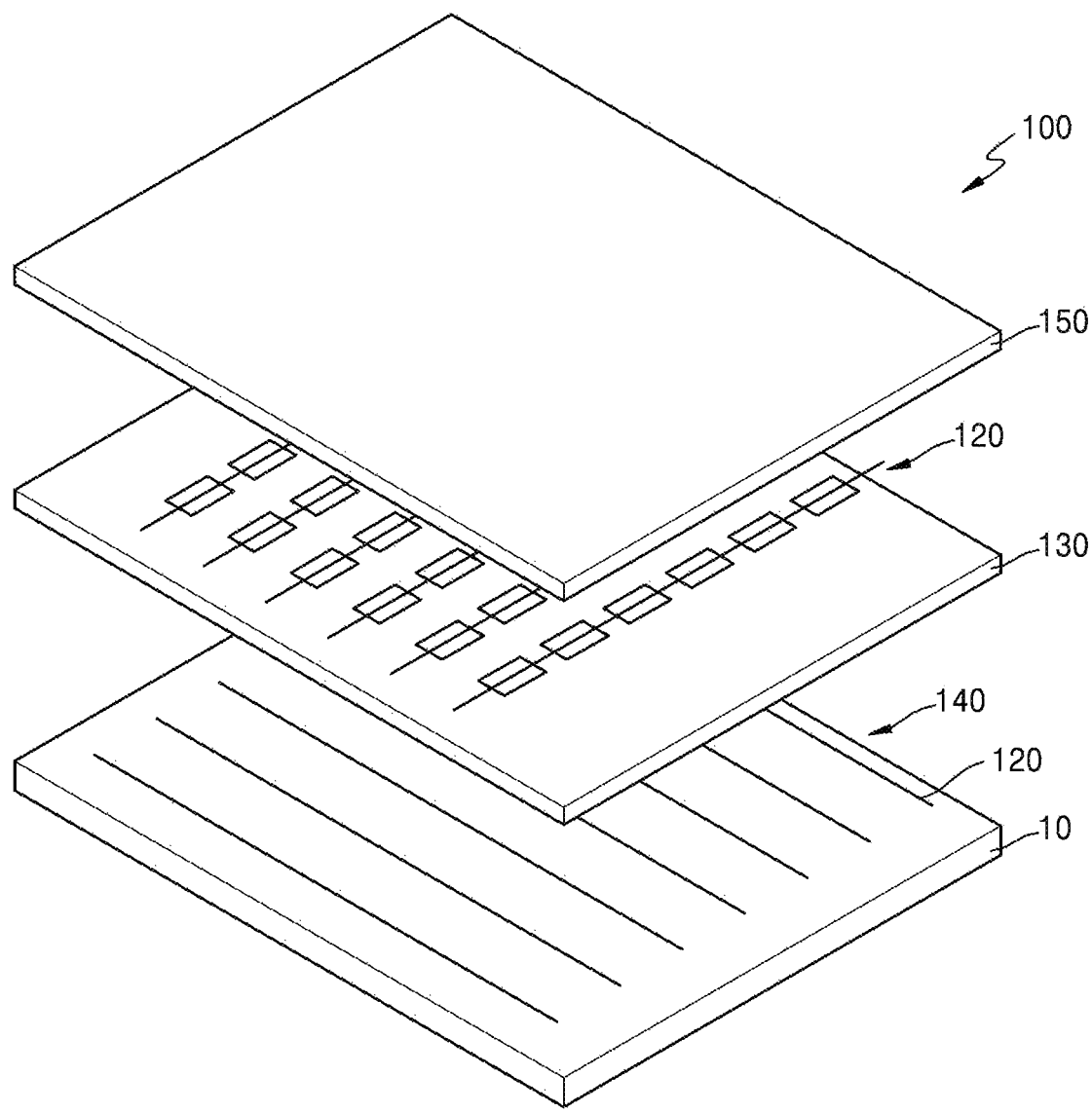
FIG. 4 is an exploded perspective view of a touch sensor according to another exemplary embodiment.

FIG. 4 is an exploded perspective view of a touch sensor 100 according to another exemplary embodiment. Repetitive descriptions of those mentioned above will be omitted.

Referring to FIG. 4, the touch sensor 100 according to the exemplary embodiment may further include an insulating layer 130 provided between a plurality of first electrodes 120 and a plurality of second electrodes 140. The insulating layer 130 may electrically separate the first electrodes 120 from the second electrodes. For example, the first electrodes 120 are provided on the insulating layer 130 and the second electrodes 140 are provided under the insulating layer 130 in FIG. 4. However, the exemplary embodiments are not limited thereto. For example, the first electrodes 120 may be provided under the insulating layer 130 and the second electrodes 140 may be provided on the insulating layer 130.

The touch sensor 100 according to the exemplary embodiment may further include a protection film 150 provided on or above the first and second electrodes 120 and 140. The protection film 150 may have a thickness of about 100 μm. The protection film 150 covers the first electrodes 120 in FIG. 4, but the exemplary embodiments are not limited thereto. For example, when the second electrodes 140 are provided on the insulating layer 130, the protection film 150 may cover the second electrodes 140. Alternatively, when the first and second electrodes 120 and 140 are provided on the same plane, the protection film 150 may cover both the first and second electrodes 120 and 140. The protection film 150 may protect the first electrodes 120 and/or the second electrodes 140 by covering at least a part of the first and second electrodes 120 and 140.

When a finger of a user or a touch pen touches the protection film 150, a mutual capacitance between the first and second electrodes 120 and 140 may vary. A capacitance measuring unit 160 may provide information about the location of touch of the finger or the touch pen on the protection film 150 by measuring the difference in the mutual capacitance between each of the first electrodes 120 and each of the second electrodes 140. In addition, the capacitance measuring unit 160 may provide information about a fingerprint pattern of the finger of the user by measuring the difference in the mutual capacitance between each of the first electrodes 120 and each of the second electrodes 140.

The capacitance measuring unit 160 may provide at least one of the information about the location of touch of the user and the information about the fingerprint pattern of the user by measuring the mutual capacitance between the first electrodes 120 and the second electrodes 140 as described above. In this case, nodes where the first and second electrodes 120 and 140 cross each other may serve as pixels configured to sense the touch input and/or the fingerprint pattern. That is, a self capacitance and/or a mutual capacitance between the first and second electrodes 120 and 140 may vary at one of the nodes where the first and second electrodes 120 and 140 cross each other, due to touch of the user, and the information about the location of touch and/or the information about the fingerprint pattern of the user may be obtained using the location of the node at which the self capacitance and/or the mutual capacitance between the first and second electrodes 120 and 140 varies.

To measure the mutual capacitance between each of the first electrodes 120 and each of the second electrodes 140, the capacitance measuring unit 160 may apply a driving voltage to the first electrodes 120. The capacitance measuring unit 160 may measure the mutual capacitance between each of the first electrodes 120 and each of the second electrodes 140 by measuring an electrical signal output from the second electrodes 140. Alternatively, the capacitance measuring unit 160 may measure the mutual capacitance between each of the first electrodes 120 and each of the second electrodes 140 by applying a driving voltage to the second electrodes 140 and measuring an electrical signal output from the first electrodes 120.

When the capacitance measuring unit 160 applies a driving voltage to the first electrodes 120 or the second electrodes 140, the mutual capacitance between the first and second electrodes 120 and 140 may vary. The variation of the mutual capacitance may be amplified due to a plurality of loop patterns 122 included in the first electrodes 120.

Figure 5:
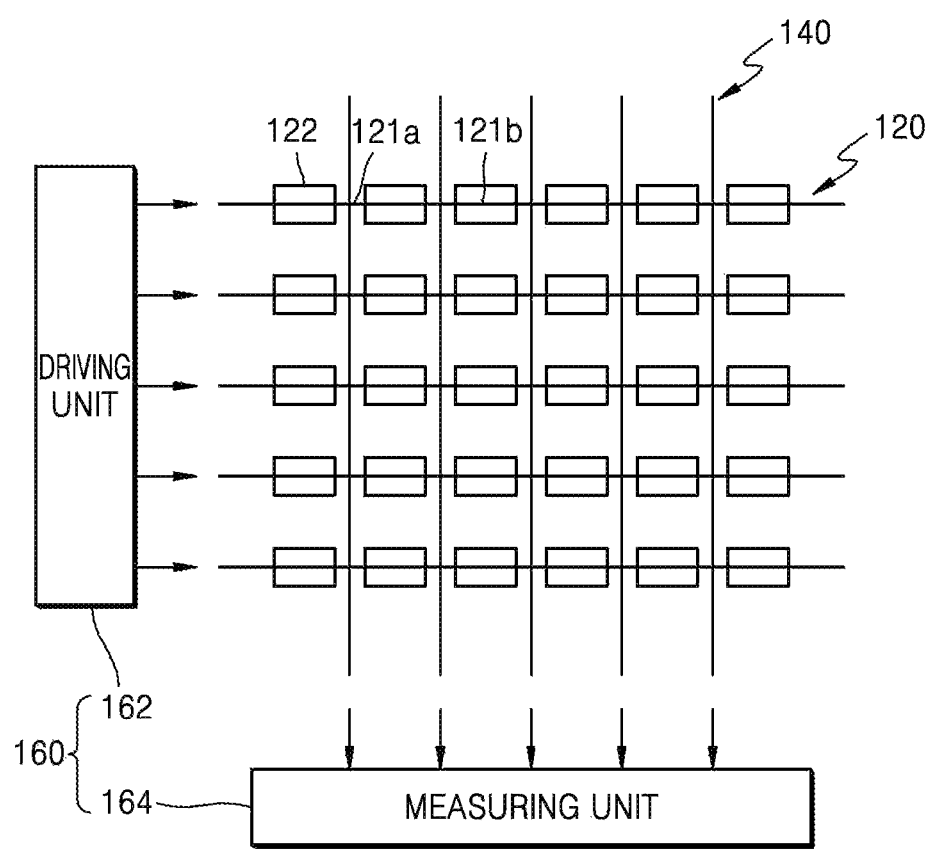
FIG. 5 is a plan view showing an example of a configuration of a plurality of first electrodes, a plurality of second electrodes, and a capacitance measuring unit.

FIG. 5 is a plan view showing an example of a configuration of a plurality of first electrodes 120, a plurality of second electrodes 140, and a capacitance measuring unit 160.

Referring to FIG. 5, the capacitance measuring unit 160 may include a driving unit (or driver) 162 configured to apply a driving voltage to the first electrodes 120, and a measuring unit (or measurer) 164 configured to measure an electrical signal output from the second electrodes 140.

The driving unit 162 may apply a driving voltage to the first electrodes 120. The driving unit 162 may apply the driving voltage in such a manner that the magnitude of the driving voltage varies, e.g., in a form of a pulse wave as time passes. When the driving unit 162 applies the driving voltage to the first electrodes 120, a potential difference may occur between the first and second electrodes 120 and 140. Due to the potential difference, an electric field may be generated between the first and second electrodes 120 and 140.

The measuring unit 164 may measure an electrical signal output from the second electrodes 140. The measuring unit 164 may measure currents flowing through the second electrodes 140. Alternatively, the measuring unit 164 may measure potentials of the second electrodes 140.

The driving unit 162 may independently apply driving voltages to the first electrodes 120. That is, the driving unit 162 may apply different driving voltages to the first electrodes 120. In this case, the measuring unit 164 may independently measure electrical signals output from the second electrodes 140. When the driving unit 162 independently applies the driving voltages to the first electrodes 120 and the measuring unit 164 independently measures the electrical signals output from the second electrodes 140, a mutual capacitance may be measured at each of a plurality of nodes where the first and second electrodes 120 and 140 cross each other. Information about a fingerprint pattern of a user may be obtained using the mutual capacitance measured at each of the nodes.

Alternatively, the driving unit 162 may apply the same driving voltage to the first electrodes 120 and the measuring unit 164 may measure a sum of electrical signals output from the second electrodes 140. In this case, a sum of mutual capacitances individually measured at the nodes may be obtained. To determine whether touch is made by the user and/or to obtain the location of touch, the driving unit 162 may apply the same driving voltage to the first electrodes 120 and the measuring unit 164 may measure the sum of the electrical signals output from the second electrodes 140.

Figure 6:
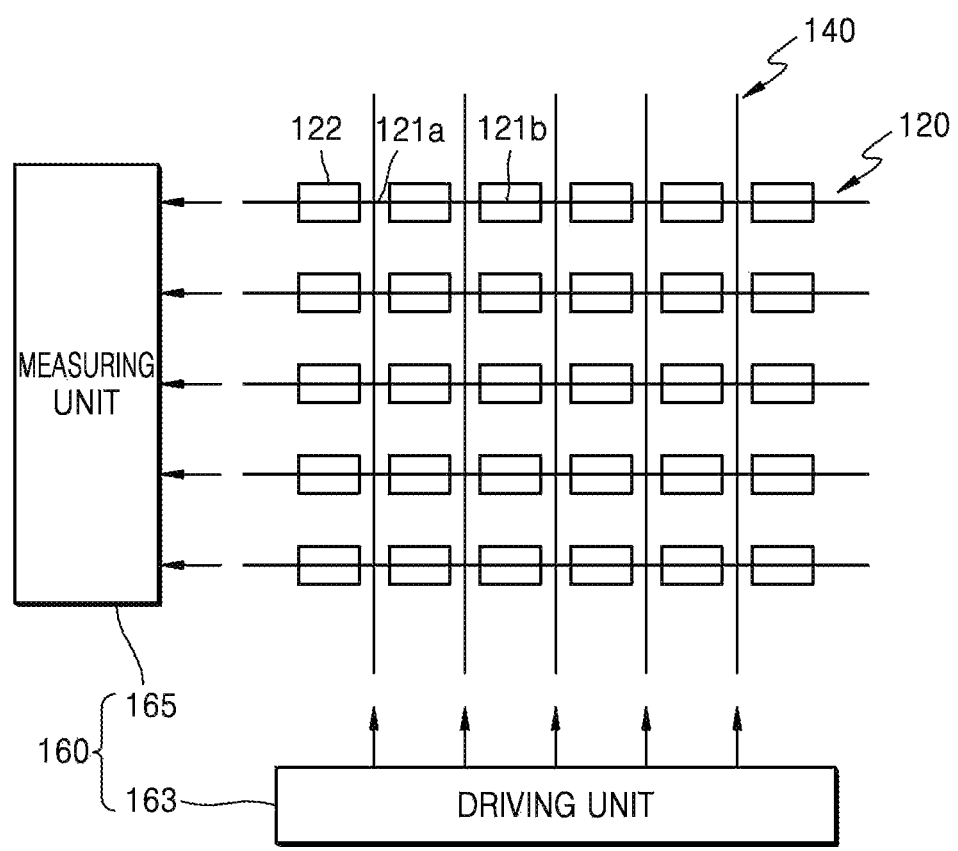
FIG. 6 is a plan view showing another example of a configuration of a plurality of first electrodes, a plurality of second electrodes, and a capacitance measuring unit.

FIG. 6 is a plan view showing another example of the configuration of a plurality of first electrodes 120, a plurality of second electrodes 140, and a capacitance measuring unit 160.

Referring to FIG. 6, the capacitance measuring unit 160 may include a driving unit 163 configured to apply a driving voltage to the second electrodes 140, and a measuring unit 165 configured to measure an electrical signal output from the first electrodes 120.

The driving unit 163 may apply a driving voltage to the second electrodes 140. The driving unit 163 may apply the driving voltage in such a manner that the magnitude of the driving voltage varies, e.g., in a form of a pulse wave as time passes. When the driving unit 163 applies the driving voltage to the second electrodes 140, a potential difference may occur between the first and second electrodes 120 and 140. Due to the potential difference, an electric field may be generated between the first and second electrodes 120 and 140.

The measuring unit 165 may measure an electrical signal output from the first electrodes 120. The measuring unit 165 may measure currents flowing through the first electrodes 120. Alternatively, the measuring unit 165 may measure potentials of the first electrodes 120.

The driving unit 163 may independently apply driving voltages to the second electrodes 140. That is, the driving unit 163 may apply different driving voltages to the second electrodes 140. In this case, the measuring unit 165 may independently measure electrical signals output from the first electrodes 120. Alternatively, the driving unit 163 may apply the same driving voltage to the second electrodes 140 and the measuring unit 165 may measure a sum of electrical signals output from the first electrodes 120.

Figure 7:
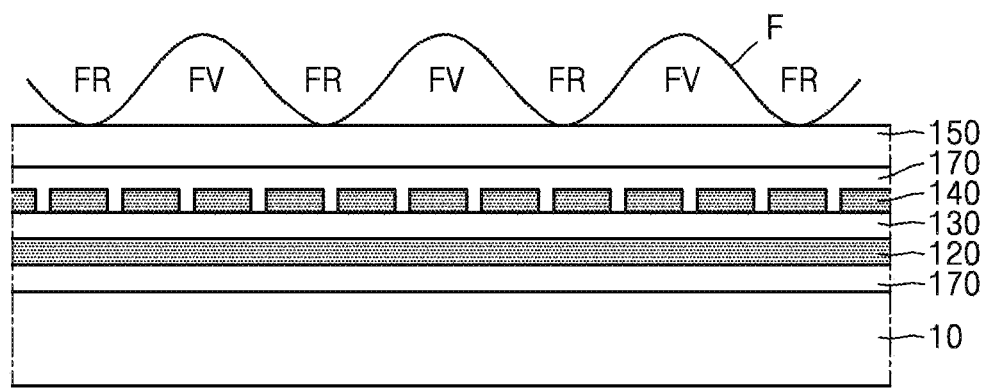
FIG. 7 is a cross-sectional view showing a fingerprint F including ridges FR and valleys FV of a finger that touches a touch sensor according to an exemplary embodiment.

FIG. 7 is a cross-sectional view showing a fingerprint F including ridges FR and valleys FV of a finger of a user that touches the touch sensor 100 according to an exemplary embodiment. In FIG. 7, reference numeral 170 denotes an adhesive layer.

Referring to FIG. 7, when the user's finger touches the protection film 150, a mutual capacitance between the first and second electrodes 120 and 140 adjacent to a region touched by the finger may vary. The mutual capacitance variation may differ between the first and second electrodes 120 and 140 adjacent to ridges FR of the fingerprint F of the finger, and between the first and second electrodes 120 and 140 adjacent to valleys FV. When the distance W1 between the first electrodes 120 and the distance W2 between the second electrodes 140 are less than the distance between the ridges FR and the valleys FV of the fingerprint F, information about a pattern of the fingerprint F of the user may be obtained by measuring the mutual capacitance variation between each of the first electrodes 120 and each of the second electrodes 140.

Figure 8:
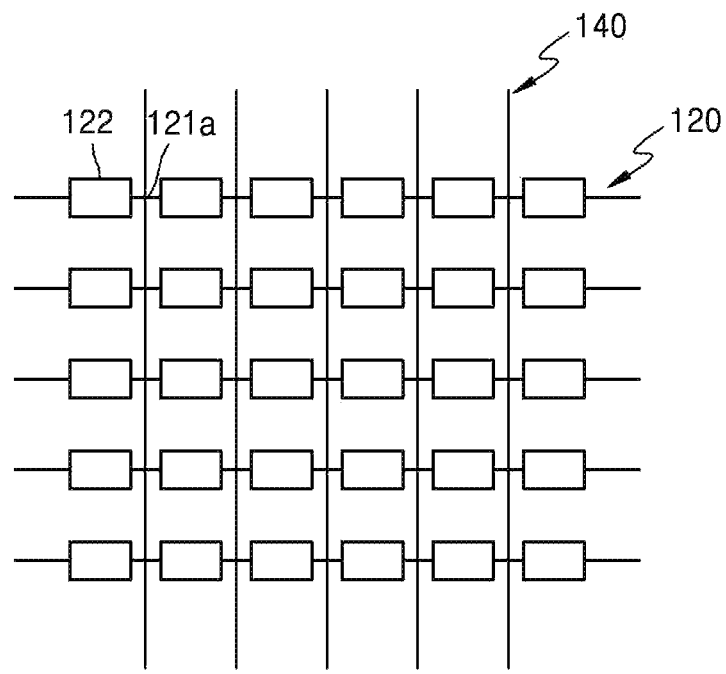
FIG. 8 is a plan view of a plurality of first electrodes and a plurality of second electrodes according to another exemplary embodiment.

FIG. 8 is a plan view of a plurality of first electrodes 120 and a plurality of second electrodes 140 according to another exemplary embodiment. Repetitive descriptions of those mentioned above will be omitted.

Referring to FIG. 8, each of the first electrodes 120 may include a plurality of first linear patterns 121a and a plurality of loop patterns 122 configured to interconnect the first linear patterns 121a. The second electrodes 140 may include linear electrodes. Compared with the first electrodes 120 illustrated in FIG. 2, the first electrodes 120 illustrated in FIG. 8 may not include a plurality of second linear patterns.

Figure 9:
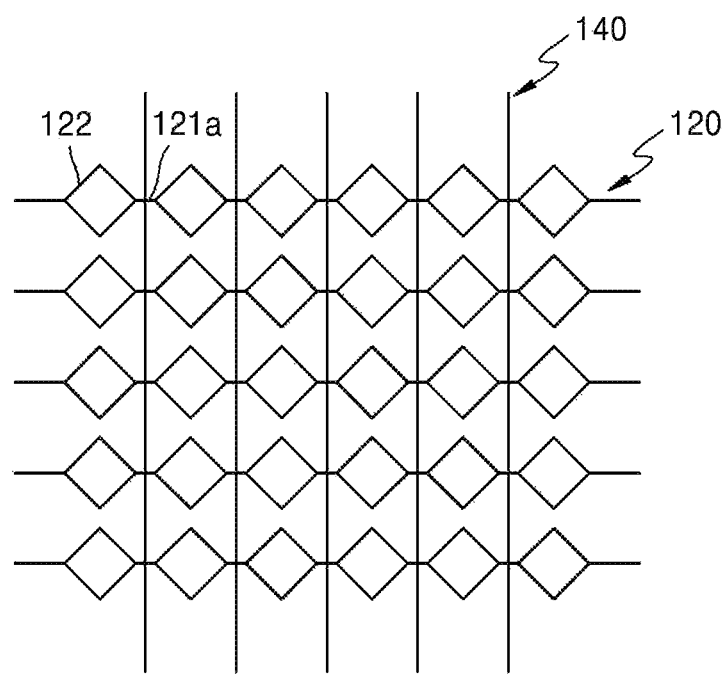
FIG. 9 is a plan view of a plurality of first electrodes and a plurality of second electrodes according to another exemplary embodiment.

FIG. 9 is a plan view of a plurality of first electrodes 120 and a plurality of second electrodes 140 according to another exemplary embodiment. Repetitive descriptions of those mentioned above will be omitted.

Referring to FIG. 9, each of the first electrodes 120 may include a plurality of first linear patterns 121a and a plurality of loop patterns 122 configured to interconnect the first linear patterns 121a. The second electrodes 140 may include linear electrodes. The loop patterns 122 may have, for example, diamond shapes. The first linear patterns 121a may be connected to corners (or vertices) of the diamond shapes. Each of the first electrodes 120 does not include a plurality of second linear patterns configured to penetrate the loop patterns 122 in FIG. 9, but the exemplary embodiments are not limited thereto. For example, each of the first electrodes 120 may further include a plurality of second linear patterns configured to penetrate the loop patterns 122. In this case, end portions of the second linear patterns may be connected to the corners (or vertices) of the loop patterns 122.

Figure 10:
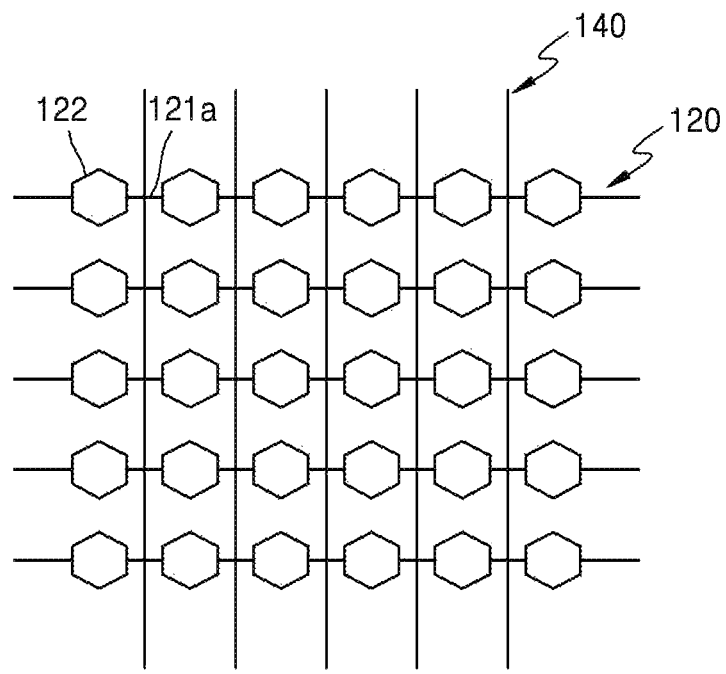
FIG. 10 is a plan view of a plurality of first electrodes and a plurality of second electrodes according to another exemplary embodiment.

FIG. 10 is a plan view of a plurality of first electrodes 120 and a plurality of second electrodes 140 according to another exemplary embodiment. Repetitive descriptions of those mentioned above will be omitted.

Referring to FIG. 10, each of the first electrodes 120 may include a plurality of first linear patterns 121a and a plurality of loop patterns 122 configured to interconnect the first linear patterns 121a. The second electrodes 140 may include linear electrodes. The loop patterns 122 may have hexagonal shapes. The first linear patterns 121a may be connected to sides of the hexagonal shapes. However, the exemplary embodiments are not limited thereto. For example, the first linear patterns 121a may be connected to corners (or vertices) of the hexagonal shapes.

Each of the first electrodes 120 does not include a plurality of second linear patterns configured to penetrate the loop patterns 122 in FIG. 10, but the exemplary embodiments are not limited thereto. For example, each of the first electrodes 120 may further include a plurality of second linear patterns configured to penetrate the loop patterns 122. In this case, end portions of the second linear patterns may be connected to the corners (or vertices) or sides of the loop patterns 122.

The shapes of the loop patterns 122 illustrated in FIGS. 7 to 10 are merely examples and the exemplary embodiments are not limited thereto. For example, the loop patterns 122 may include, but not limited to, any one of circular, oval, polygonal, or closed curve shapes.

Figure 11:
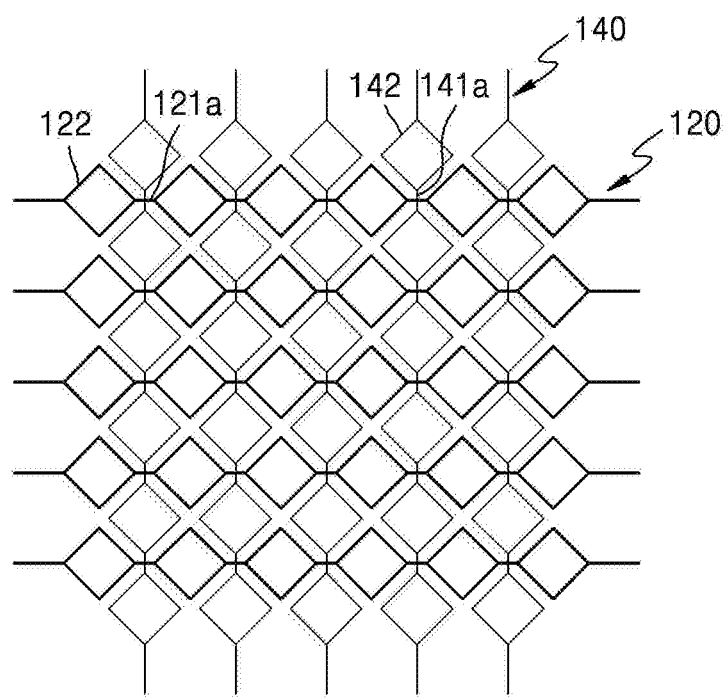
FIG. 11 is a plan view of a plurality of first electrodes and a plurality of second electrodes according to another exemplary embodiment.

FIG. 11 is a plan view of a plurality of first electrodes 120 and a plurality of second electrodes 140 according to another exemplary embodiment. Repetitive descriptions of those mentioned above will be omitted.

Referring to FIG. 11, each of the first electrodes 120 may include a plurality of first linear patterns 121a and a plurality of loop patterns 122 configured to interconnect the first linear patterns 121a. Each of the second electrodes 140 may include a plurality of first linear patterns 141a and a plurality of loop patterns 142 configured to interconnect the first linear patterns 141a.

Compared with the exemplary embodiments in FIGS. 1 through 10 in which each of the second electrodes 140 includes a single linear pattern, each of the second electrodes 140 of FIG. 11 may include a plurality of first linear patterns 141a and a plurality of loop patterns 142. The shapes of the loop patterns 142 included in each of the second electrodes 140 may be the same as or different from those of the loop patterns 122 included in each of the first electrodes 120. Each of the second electrodes 140 may further include a plurality of second linear patterns configured to penetrate the loop patterns 142.

Figure 12A:
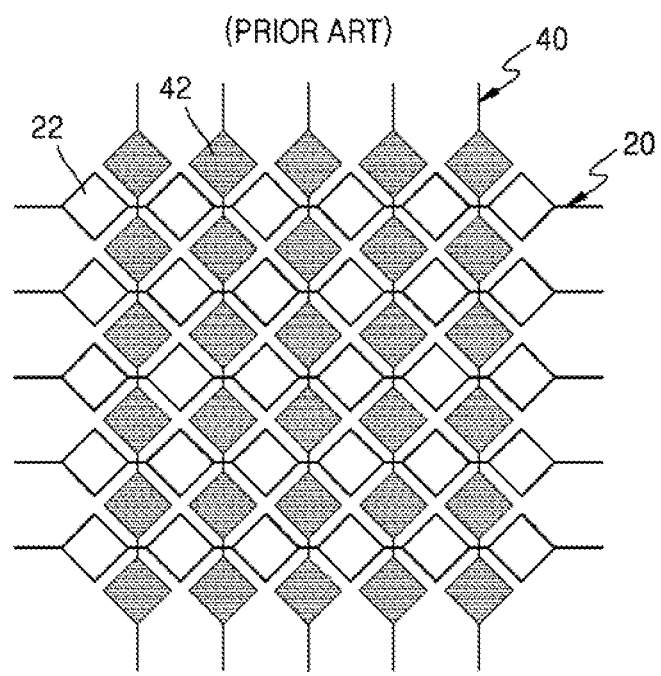
FIGS. 12A to 12C are plan views of a plurality of first electrodes and a plurality of second electrodes according to comparative examples.
Figure 12B:
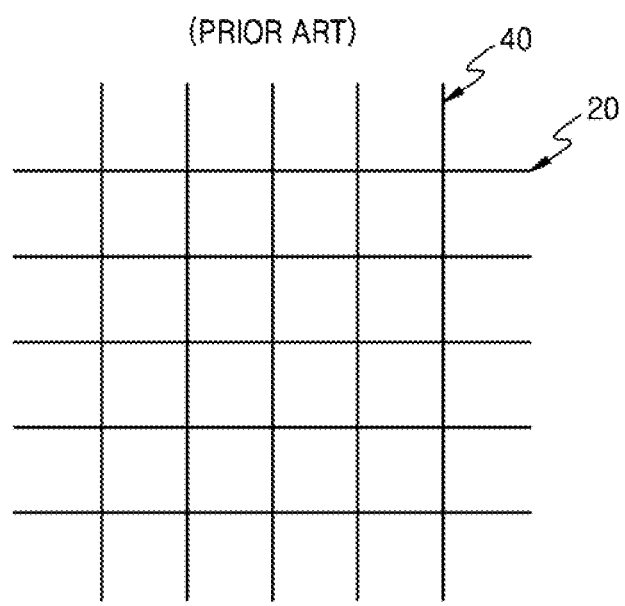
Figure 12C:
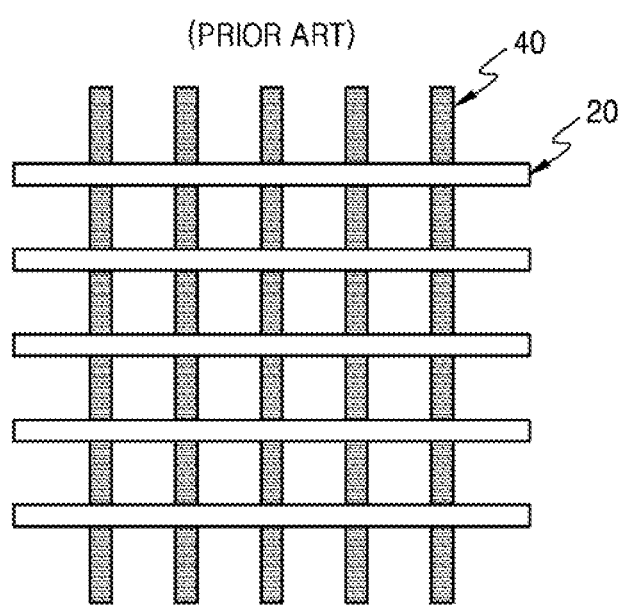

FIGS. 12A to 12C are plan views of a plurality of first electrodes 20 and a plurality of second electrodes 40 according to comparative examples.

Referring to FIG. 12A, each of the first electrodes 20 may include a plurality of solid patterns 22. Each of the second electrodes 40 may also include a plurality of solid patterns 42. The solid patterns may include non-empty patterns (or patterns in which no void is provided therein). When the first electrodes 20 and the second electrodes 40 include solid patterns 22 and 42 (or non-empty patterns) and include metal, viewing of an image displayed on a display panel under the first and second electrodes 20 and 40 may be affected. In other words, transmittance of light emitted from the display panel 10 through the first and second electrodes 120 and 140 may be decreased. When the solid patterns 22 and 42 include a transparent material such as indium tin oxide (ITO), resistances of the first and second electrodes 20 and 40 are increased. In response to the resistances of the first and second electrodes 20 and 40 being increased, a driving speed of a touch sensor may be lowered.

Referring to FIG. 12B, the first and second electrodes 20 and 40 may be provided as linear patterns. However, when the first and second electrodes 20 and 40 do not include loop patterns, a mutual capacitance variation between the first and second electrodes 20 and 40 due to touch of a user may be reduced. In response to the mutual capacitance variation being reduced, sensitivity of sensing a fingerprint pattern of the user may be lowered.

Referring to FIG. 12C, the first and second electrodes 20 and 40 may have a large line width. In this case, when the first and second electrodes 20 and 40 include metal, viewing of an image displayed on a display panel under the first and second electrodes 20 and 40 may be affected. When the first and second electrodes 20 and 40 include a transparent material such as indium tin oxide (ITO), resistances of the first and second electrodes 20 and 40 are increased. In response to the resistances of the first and second electrodes 20 and 40 being increased, a driving speed of a touch sensor may be lowered.

Compared to the above-described comparative examples, in the touch sensor 100 according to any of the exemplary embodiments of FIGS. 1 to 11, the first and second electrodes 120 and 140 are configured as metal lines, and therefore, viewing of an image displayed on the display panel 10 under the first and second electrodes 120 and 140 may be less affected or substantially unaffected. Furthermore, according to the exemplary embodiments, the first and second electrodes 120 and 140 include metal having a small resistivity, and therefore, resistances of the first and second electrodes 120 and 140 may be reduced. In response to the first and second electrodes 120 and 140 having small resistances, a driving speed of the touch sensor 100 may be increased. In addition, because the first electrodes 120 include the loop patterns 122, a mutual capacitance variation between the first and second electrodes 120 and 140 due to touch of a user may be increased. In response to the mutual capacitance variation being increased, sensitivity of sensing a fingerprint of the user by the touch sensor 100 may also be increased.

Figure 13:
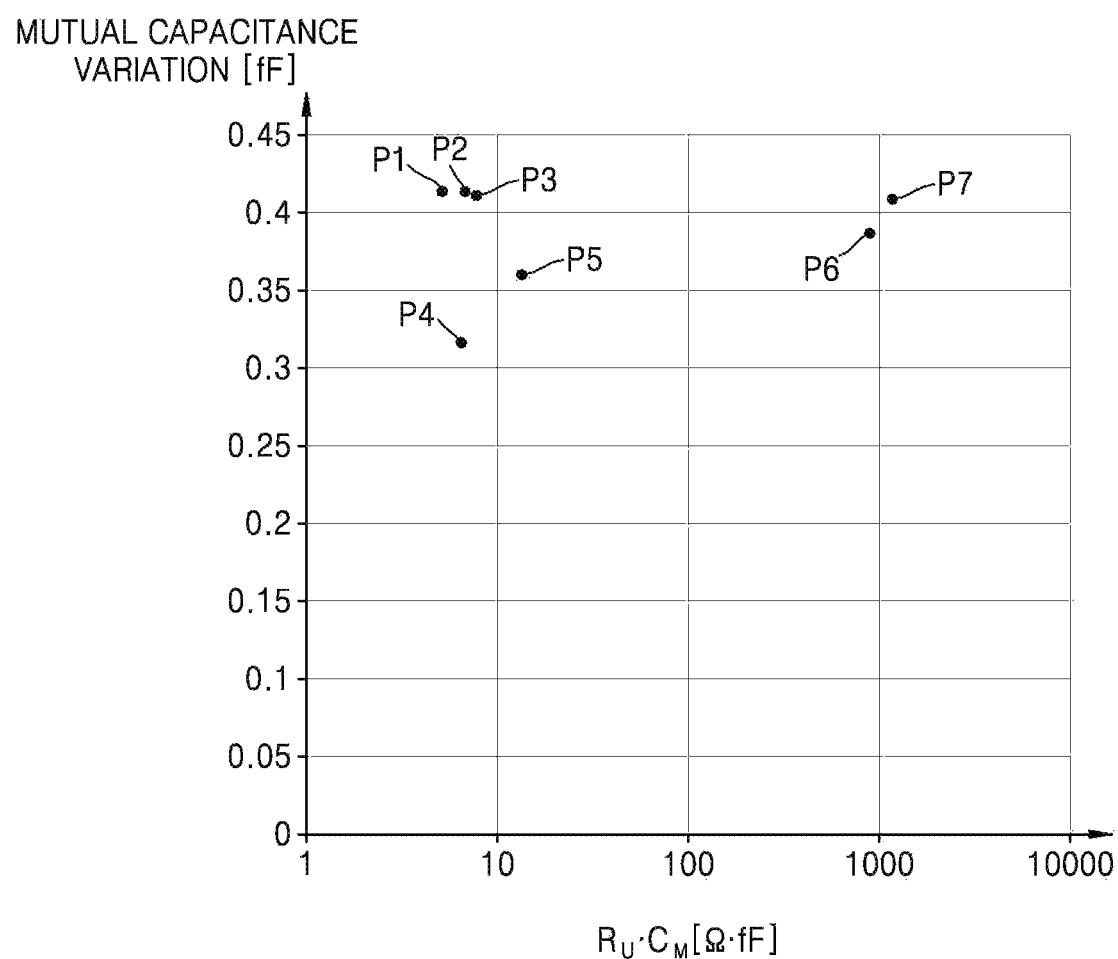
FIG. 13 is a graph showing a difference in performance between touch sensors according to exemplary embodiments and touch sensors using first and second electrodes of FIGS. 12A to 12C.

FIG. 13 is a graph showing the difference in performance between the touch sensors 100 according to exemplary embodiments and touch sensors using the first and second electrodes 20 and 40 of FIGS. 12A to 12C.

In FIG. 13, a horizontal axis (or x axis) indicates a product of a resistance and a mutual capacitance between each of the first electrodes and each of the second electrodes at respective nodes at which the first electrode and the second electrode cross each other. The product of the resistance and the mutual capacitance may be an RC time constant related to a driving time of the touch sensor 100. Accordingly, a small value of the product of the resistance and the mutual capacitance on the horizontal axis may indicate a high driving speed of the touch sensor 100.

In FIG. 13, a vertical axis (or y axis) indicates a mutual capacitance variation due to touch of a user. A large mutual capacitance variation may indicate a high sensitivity of the touch sensor.

In FIG. 13, points P4, P6, and P7 indicate the performance of the touch sensors using the first and second electrodes 20 and 40 of FIGS. 12A to 12C according to the comparative examples.

For example, point P4 indicates the performance of the touch sensor using the first and second electrodes 20 and 40 illustrated in FIG. 12B. Point P6 indicates the performance of the touch sensor using the first and second electrodes 20 and 40 illustrated in FIG. 12A. Point P7 indicates the performance of the touch sensor using the first and second electrodes 20 and 40 illustrated in FIG. 12C.

Referring to FIG. 13, when the first and second electrodes 20 and 40 are configured as linear electrodes as illustrated in FIG. 12B, the mutual capacitance variation between the first and second electrodes 20 and 40 may be reduced. Accordingly, sensitivity of the touch sensor may be lowered. When the thickness of the first and second electrodes 20 and 40 is increased as illustrated in FIG. 12C, the product of the resistance and the mutual capacitance may be increased and thus the driving speed of the touch sensor may be lowered. When the first and second electrodes 20 and 40 include the solid patterns 22 and 42 as illustrated in FIG. 12A, the product of the resistance and the mutual capacitance may be increased and thus the driving speed of the touch sensor may be lowered.

Points P1, P2, P3, and P5 in FIG. 13 indicate the performance of the touch sensors 100 according to exemplary embodiments.

For example, point P1 indicates the performance of the touch sensor 100 using the first and second electrodes 120 and 140 illustrated in FIG. 2. Point P2 indicates the performance of the touch sensor 100 using the first and second electrodes 120 and 140 illustrated in FIG. 8. Point P3 indicates the performance of the touch sensor 100 using the first and second electrodes 120 and 140 illustrated in FIG. 9. Point P5 indicates the performance of the touch sensor 100 using the first and second electrodes 120 and 140 illustrated in FIG. 10.

Referring to FIG. 13, when the first electrodes 120 include the loop patterns 122 and the second electrodes 140 are configured as linear electrodes, the mutual capacitance variation may be increased and the product of the resistance and the mutual capacitance may be reduced. That is, when the first electrodes 120 include the loop patterns 122 and the second electrodes 140 are configured as linear electrodes, sensitivity of the touch sensor 100 may be increased and a driving time thereof may be reduced.

As indicated by point P5, when the first and second electrodes 120 and 140 include the loop patterns 122 and 142, respectively, although an improvement in performance is not greater than those of P1, P2, and P3, a higher sensitivity and a shorter driving time may be achieved compared to the comparative examples.

Figure 14:
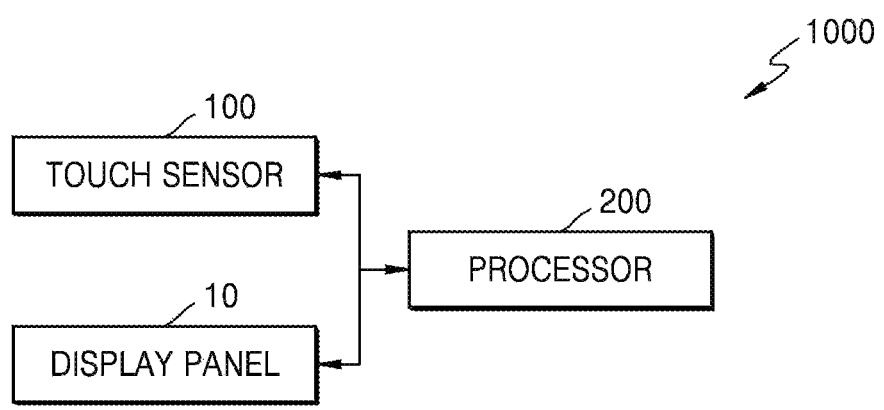
FIG. 14 is a block diagram of an electronic device according to an exemplary embodiment.

FIG. 14 is a block diagram of an electronic device 1000 according to an exemplary embodiment.

Referring to FIG. 14, the electronic device 1000 according to an exemplary embodiment may include a display panel 10, a touch sensor 100, and a processor 200 configured to obtain at least one of the location of touch and a fingerprint pattern of a user based on a mutual capacitance measured by the capacitance measuring unit 160 of the touch sensor 100.

The electronic device 1000 illustrated in FIG. 14 may be an electronic device configured to display an image on the display panel 10 and may be, but is not limited to, for example, a mobile communication device and/or a smartphone.

The touch sensor 100 may be any of those according to the exemplary embodiments of FIGS. 1 to 13. The processor 200 may obtain at least one of the location of touch and the fingerprint pattern of the user based on the mutual capacitance between the first and second electrodes 120 and 140, which is measured by the capacitance measuring unit 160 of the touch sensor 100. For example, the processor 200 may include a central processing unit (CPU).

The electronic device 1000 according to the exemplary embodiment may include a computer-readable recording medium to store software and algorithms used to obtain the fingerprint pattern and/or the location of touch of the user. Herein, examples of the computer-readable recording medium include magnetic storage media (e.g., read-only memory (ROM), random-access memory (RAM), floppy disks, and hard disks), optical recording media (e.g., compact disc (CD)-ROMs and digital versatile discs (DVDs)), etc. The computer-readable recording medium can also be distributed over network coupled computer systems so that computer-readable code is stored and executed in a distributed fashion. The computer-readable recording medium can be read by a computer, stored in memory, and executed by the processor 200.

At least one of the components, elements, modules or units represented by a block as illustrated in the drawings may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a CPU that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

The touch sensor 100 according to exemplary embodiments and the electronic device 1000 including the touch sensor 100 have been described above in relation to FIGS. 1 to 14. According to the above-described embodiments, influence of the first and second electrodes 120 and 140 of the touch sensor 100 on viewing (or visibility) of an image displayed on the display panel 10 may be reduced. In addition, sensitivity of the touch sensor 100 may be increased and a driving time thereof may be reduced.

It should be understood that embodiments described herein should be considered in a descriptive sense only and not for purposes of limitation. Descriptions of features or aspects within each exemplary embodiment should typically be considered as available for other similar features or aspects in other exemplary embodiments.

While one or more embodiments have been described with reference to the figures, it will be understood by those of ordinary skill in the art that various changes in form and details may be made therein without departing from the spirit and scope as defined by the following claims

What is claimed is:

1. A touch sensor comprising:
a plurality of first electrodes extending in a first direction and arranged in parallel to each other;
a plurality of second electrodes extending in a second direction and arranged in parallel to each other to cross the plurality of first electrodes; and
a capacitance measurer configured to obtain mutual capacitances between the plurality of first electrodes and the plurality of second electrodes,
wherein at least one of the plurality of first electrodes consists of:
a plurality of first linear patterns provided along the first direction, each first linear pattern from the plurality of first linear patterns crossing a second electrode from the plurality of second electrodes, respectively; and
a plurality of loop patterns between the plurality of first linear patterns, and
a plurality of second linear patterns, each second linear pattern from the plurality of second linear patterns penetrating a loop pattern from the plurality of loop patterns and extending in the first direction, respectively,
wherein each loop pattern from the plurality of loop patterns consists of two loop side lines, and a single second linear pattern from the plurality of second linear patterns, respectively, wherein the plurality of second electrodes comprise a plurality of third linear patterns provided along the second direction, and wherein each first linear pattern from the plurality of first linear patterns comprises a bridge spaced apart from and only crossing a single third linear pattern from the plurality of second electrodes.

2. The touch sensor of claim 1, wherein the plurality of loop patterns and the plurality of second linear patterns included in the plurality of first electrodes are provided on a same plane as the plurality of second electrodes.

3. The touch sensor of claim 1, wherein the plurality of first linear patterns are provided to respective nodes wherein at each node one first electrode from the plurality of first electrodes and one second electrode from the plurality of second electrodes respectively cross each other.

4. The touch sensor of claim 1,
wherein each second linear pattern from the plurality of second linear patterns is connected to two first linear patterns from the plurality of first linear patterns, respectively.

5. The touch sensor of claim 1, wherein the plurality of loop patterns respectively have polygonal shapes or circular shapes.

6. The touch sensor of claim 5, wherein the plurality of loop patterns respectively have rectangular shapes, and
wherein long sides of the rectangular shapes are parallel to the first direction.

7. The touch sensor of claim 5, wherein the plurality of loop patterns have diamond shapes or hexagonal shapes.

8. The touch sensor of claim 1, wherein the plurality of second electrodes comprise linear electrodes provided along the second direction.

9. The touch sensor of claim 1, wherein the plurality of second electrodes comprise:
a plurality of second loop patterns between the plurality of third linear patterns.

10. The touch sensor of claim 1, wherein the first and second directions are perpendicular to each other.

11. The touch sensor of claim 1, wherein the plurality of first electrodes and the plurality of second electrodes are configured as metal lines.

12. The touch sensor of claim 11, wherein the metal line of each of the plurality of second electrodes and the metal line of the first linear pattern included in each of the plurality of first electrodes have a line width less than 3 μm.

13. The touch sensor of claim 11, wherein the metal lines comprise at least one of aluminum (Al), copper (Cu), molybdenum (Mo), chromium (Cr), an Ag—Pd—Cu (APC) alloy, and silver (Ag).

14. The touch sensor of claim 1, wherein the plurality of first electrodes and the plurality of second electrodes are electrically separated from each other at nodes wherein at each node one first electrode from the plurality of first electrodes and one second electrode from the plurality of second electrodes respectively cross each other.

15. The touch sensor of claim 1, further comprising an insulating layer provided between the plurality of first electrodes and the plurality of second electrodes.

16. The touch sensor of claim 1, wherein the capacitance measurer comprises:
a driver configured to apply a driving voltage to the plurality of first electrodes; and
a measurer configured to measure an electrical signal output from the plurality of second electrodes.

17. The touch sensor of claim 16, wherein the driver is configured to independently apply driving voltages to the plurality of first electrodes, and
wherein the measurer is configured to independently measure electrical signals output from the plurality of second electrodes.

18. The touch sensor of claim 16, wherein the driver is configured to apply the same driving voltage to the plurality of first electrodes, and
wherein the measurer is configured to measure a sum of electrical signals output from the plurality of second electrodes.

19. The touch sensor of claim 1, wherein the capacitance measurer comprises:
a driver configured to apply a driving voltage to the plurality of second electrodes; and
a measurer configured to measure an electrical signal output from the plurality of first electrodes.

20. The touch sensor of claim 19, wherein the driver is configured to independently apply driving voltages to the plurality of second electrodes, and
wherein the measurer is configured to independently measure electrical signals output from the plurality of first electrodes.

21. The touch sensor of claim 19, wherein the driver is configured to apply the same driving voltage to the second electrodes, and
wherein the measurer is configured to measure a sum of electrical signals output from the plurality of first electrodes.

22. The touch sensor of claim 1, further comprising a protection film provided on or above the plurality of first electrodes and the plurality of second electrodes.

23. An electronic device comprising:
a display panel;
a touch sensor provided on the display panel, the touch sensor comprising:
a plurality of first electrodes extending in a first direction and arranged in parallel to each other;

a plurality of second electrodes extending in a second direction and arranged in parallel to each other to cross the first electrodes; and a capacitance measurer configured to obtain mutual capacitances between the plurality of first electrodes and the plurality of second electrodes; and a processor configured to obtain at least one of a location of touch and a fingerprint pattern of a finger that performs the touch based on the obtained mutual capacitances, wherein at least one of the plurality of first electrodes consists of:

a plurality of first linear patterns provided along the first direction, a first linear pattern from the plurality of first linear patterns crossing a second electrode from the plurality of second electrodes, respectively; and a plurality of loop patterns between the plurality of first linear patterns, and a plurality of second linear patterns, each second linear pattern from the plurality of second linear patterns penetrating a loop pattern from the plurality of loop patterns and extending in the first direction, respectively, wherein each loop pattern from the plurality of loop patterns consists of two loop side lines, and a single second linear pattern from the plurality of second linear patterns, respectively, wherein the plurality of second electrodes comprise a plurality of third linear patterns provided along the second direction, and wherein each first linear pattern from the plurality of first linear patterns comprises a bridge spaced apart from and only crossing a single third linear pattern from the plurality of second electrodes.

* * * * *